(12) United States Patent  
Peterson

(10) Patent No.: US 7,762,926 B2
(45) Date of Patent: Jul. 27, 2010

(54) HILL HOLD METHOD AND SYSTEM

(75) Inventor: Gregory E. Peterson, Sylvan Lake, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 705 days.

(21) Appl. No.: 11/615,199

(22) Filed: Dec. 22, 2006

(65) Prior Publication Data

US 2008/0153669 A1  Jun. 26, 2008

(51) Int. Cl.
  *B60T 11/10* (2006.01)
(52) U.S. Cl. .................. 477/172; 192/13 A; 192/219.1
(58) Field of Classification Search ................. 477/170, 477/172; 192/13 A, 219.1
  See application file for complete search history.

(56) References Cited

U.S. PATENT DOCUMENTS 5,916,062 A * 6/1999 Siepker ...................... 477/194
7,125,085 B2 * 10/2006 Ohsaki et al. ............. 303/119.1
7,600,827 B2 * 10/2009 Tamai et al. ................ 303/191

OTHER PUBLICATIONS

"Thunder Racing" Jul. 20, 2006, products from thunderracing.com catalog website for Hurst Shifters 'Roll Control' Line Lock.
CFM (Central Florida Motorsports) Jul. 20, 2006, product from webpage for Hurst Performance Roll Control.

* cited by examiner

*Primary Examiner*—David D Le
*Assistant Examiner*—Derek D Knight
(74) *Attorney, Agent, or Firm*—Ralph E. Smith

(57) ABSTRACT

A hill-hold method and system for a vehicle with manual transmission provides automated brake release timing when the vehicle's clutch is still disengaged to minimize or even prevent backward coasting of such a vehicle on a non-zero grade or hill by delaying full release of the brakes when the vehicle operator is in the transition of releasing the brake pedal and moving to the accelerator pedal.

8 Claims, 3 Drawing Sheets

HILL HOLD METHOD AND SYSTEM

FIELD OF THE INVENTION

The present invention relates to vehicular motion control. More particularly, the invention pertains to provision of an automated hill-hold function to inhibit backward coasting of a vehicle with a manual transmission.

BACKGROUND OF THE INVENTION

A well-known problem with vehicles equipped with manual transmissions and clutches occurs when the vehicle comes to a stop on a hill or non-zero road grade. When the driver wishes to start out again in this circumstance, he/she must move one foot off the brake pedal to depress the accelerator while starting to engage the clutch. Often the brake will fully release before the clutch is engaged, resulting in undesired backward rolling of the vehicle down the hill.

There is a need in the art for an automatically implemented hill-hold function for preventing undesired movement of a vehicle with a manual transmission upon brake release prior to full clutch activation.

SUMMARY OF THE INVENTION

In one aspect of the invention, a method of providing a hill-hold function for a vehicle equipped with a manual transmission and clutch includes providing a selectively variable orifice in a brake hydraulic line of the vehicle, operative to fully close at zero vehicle speed and actuation of a brake pedal of the vehicle. The variable orifice is opened at a first rate upon detection of release of the brake pedal while the clutch is disengaged and the throttle is starting to increase. The variable orifice is then opened at a second rate higher than the first rate upon detection of clutch activation.

In another aspect of the invention, an arrangement for providing a hill-hold function in a vehicle equipped with a manual transmission and clutch includes a selectively variable orifice positioned in a hydraulic brake fluid line of the vehicle. An auxiliary brake controller is coupled to a control input of the selectively variable orifice and is operative to open and close the selectively variable orifice at a rate determined by a signal presented to the control input. An electronic vehicle control module is coupled to a clutch pedal position sensor, a throttle sensor, a vehicle speed sensor and a brake pedal sensor, each coupled to a respective input of the electronic vehicle control module. The electronic vehicle control module is operative to activate and deactivate the auxiliary brake controller as a function of inputs received from one or more sensors coupled to the vehicle control module inputs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The approach of the instant invention is to automatically hold the hydraulic brake line pressure for a predetermined time period when the brake pedal is initially released and to then modulate that line pressure down to zero as the brake pedal is fully released. As will be shown, this will require a selectively variable orifice, preferably an electrically variable orifice, associated with a brake hydraulic line in the vehicle which would be normally open, goes full closed at zero vehicle speed, opens at a reduced rate as throttle speed begins to increase and finally opens at a maximum rate when the clutch switch is triggered evidencing reengagement of the clutch. If the orifice response time is fast enough, it could open with the clutch switch deactivation. The clutch switch position should be calibrated to allow enough time for even a slower responding orifice to release the brakes.

It may be possible to use current ABS hydraulics to serve such a function rather than adding a new single variable or on/off orifice upstream of the ABS circuit. However, ABS systems are not typically engineered to apply and hold hydraulic pressure for extended time periods.

The basic embodiments are disclosed herein. The first is a more economical approach and does not use a grade sensor. The second uses a grade sensor and only activates an auxiliary brake control when a non-level road surface is detected.

Figure 1:
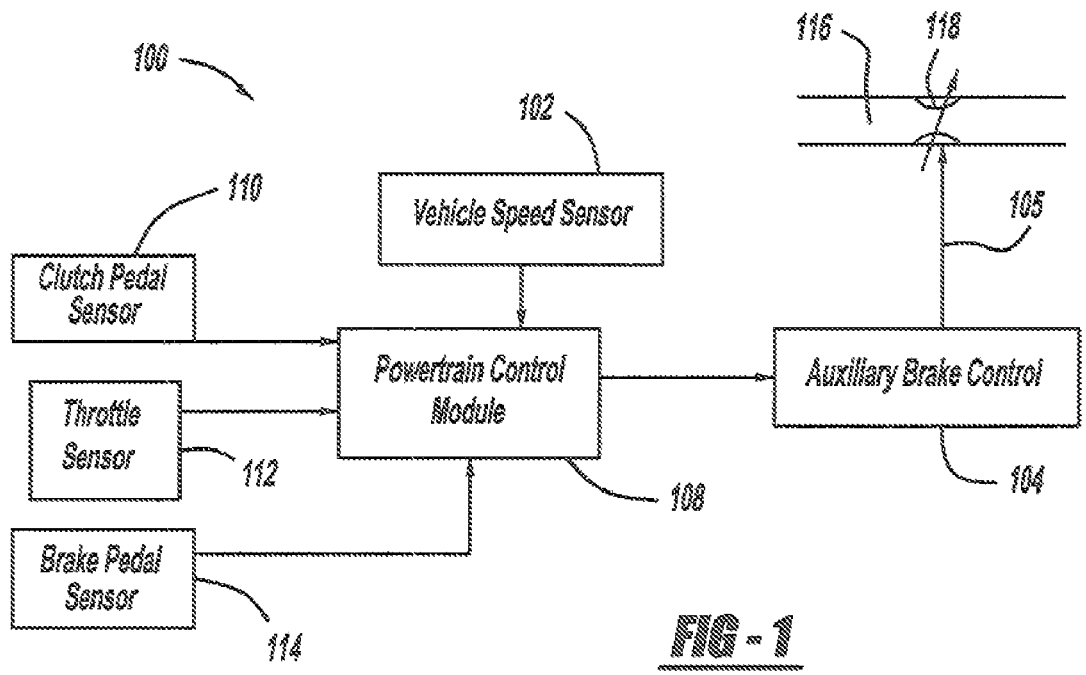
FIG. 1 is a block diagram of a system arranged for providing a vehicle hill-hold function is accordance with the teachings of the invention.

With reference to FIG. 1, the economical system is depicted. System 100 includes a selectively variable orifice 118 positioned in a hydraulic fluid line 116 of the vehicle. Variable orifice 118 has a control input 105 coupled to the orifice between the orifice and an auxiliary brake control unit 104.

A power train control module or a specialized electronic control module for the vehicle 108 activates and deactivates auxiliary brake control 104 in accordance with a vehicle speed sensor 102, a clutch pedal sensor 110, a throttle sensor 112 and a brake pedal sensor 114, each of these sensors being coupled to an input of power train control module 108.

In production vehicles equipped with cruise control, the cruise disconnect switch associated with the clutch in a manual transmission could be used as the clutch pedal sensor. It will be apparent to those skilled in the art, however, that a separate clutch pedal activation sensor 110 could be provided.

Figure 3:
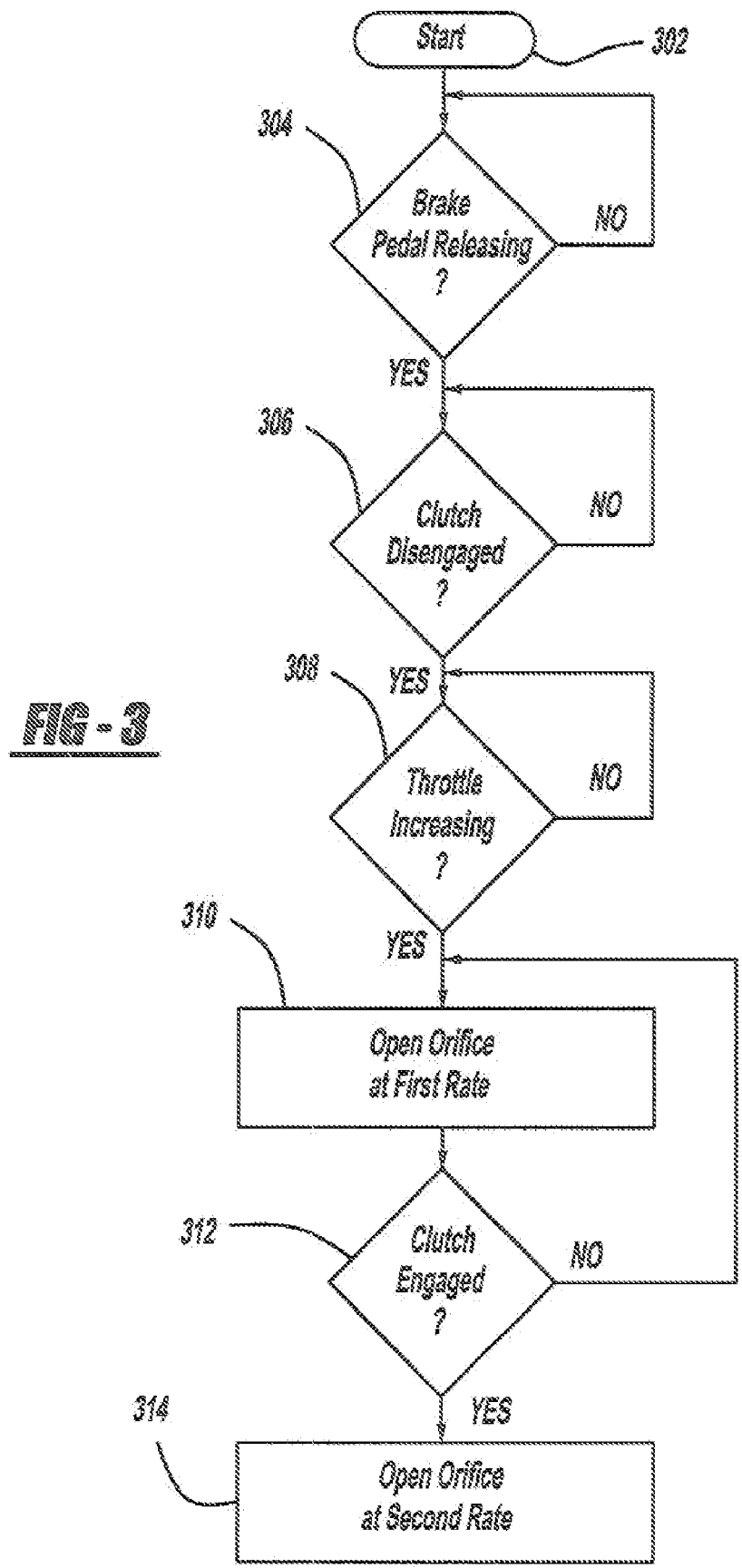
FIG. 3 is a flow chart of a hill-hold method implemented by the system of FIG. 1.

With the system as arranged in FIG. 1, the method for activating a hill-hold function is performed by power train control module 108 in accordance with the flow chart set forth in FIG. 3. The routine is entered at 302 and initially a test is performed to determine whether the brake pedal is beginning to release at step 304. This test is maintained as long as the answer is no. If the brake pedal is beginning to release, then at step 306 a test is performed to determine whether the clutch is disengaged by monitoring clutch pedal sensor 110 of FIG. 1. This test is continued until the answer is yes, at which point in step 308 the controller 108 of FIG. 1 monitors the throttle sensor 112 to determine if the throttle is beginning to increase. This test is continued until the answer is yes, at which point at step 310 the selectively variable orifice 118 of FIG. 1 is opened at a first relatively slow rate. This can be accomplished via pulse width modulation of an actuation signal on control input 105. While opening the orifice at the first rate in step 310, controller 108 is monitoring for clutch engagement at step 312. When it has been determined from clutch pedal sensor 110 of FIG. 1 that the clutch has become engaged, then the variable orifice 118 is opened at a second faster rate than the first rate. Hence, during that transition period when the operator is switching from the brake pedal to the accelerator pedal, release of full braking is delayed to prevent undesirable backward rolling until the clutch is fully engaged.

Figure 2:
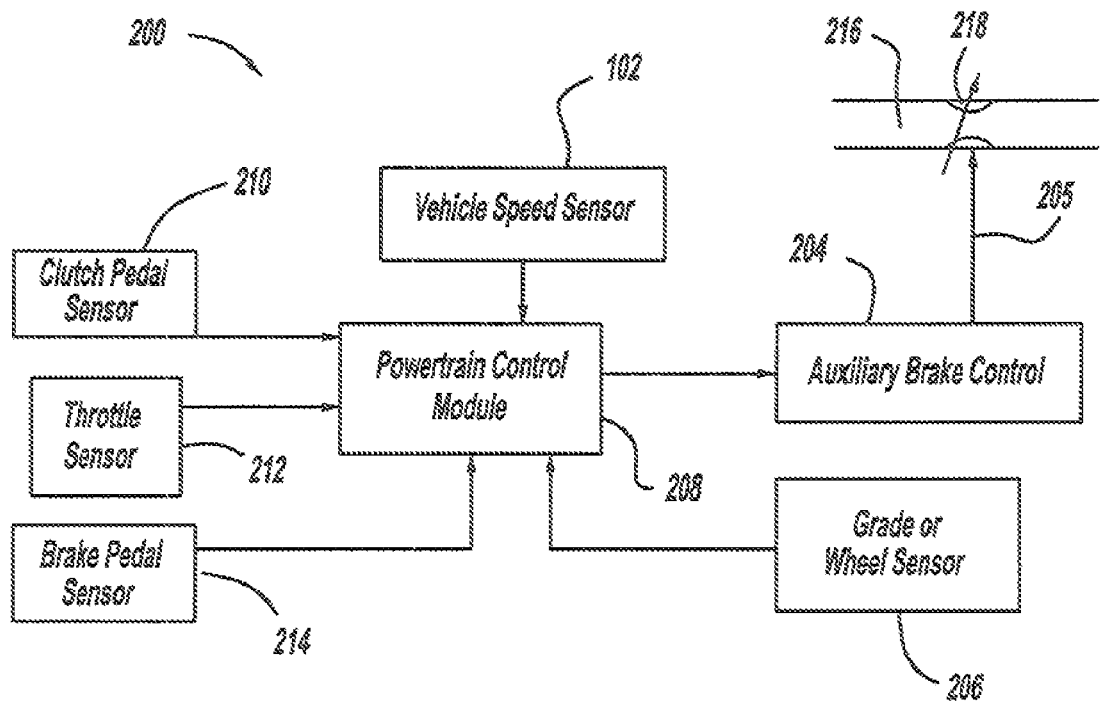
FIG. 2 is a block diagram of an alternative embodiment of a system arranged for providing a vehicle hill-hold function in accordance with the teachings of the invention.

With reference to FIG. 2, a system is set forth which is only activated when a grade or hill is detected beneath the vehicle. This requires an additional grade or wheel sensor 206 which is monitored by power train control module 208. Similarly to FIG. 1, the remaining elements are a hydraulic brake line 216 containing a variable orifice 218 which is selectively opened and closed in accordance with a signal appearing at control input 205 emanating from auxiliary brake controller 204.

Power train control module 208 implements the hill-hold function in accordance with various vehicle states as presented by vehicle speed sensor 102, clutch pedal sensor 210, throttle sensor 212 and brake pedal sensor 214.

Figure 4:
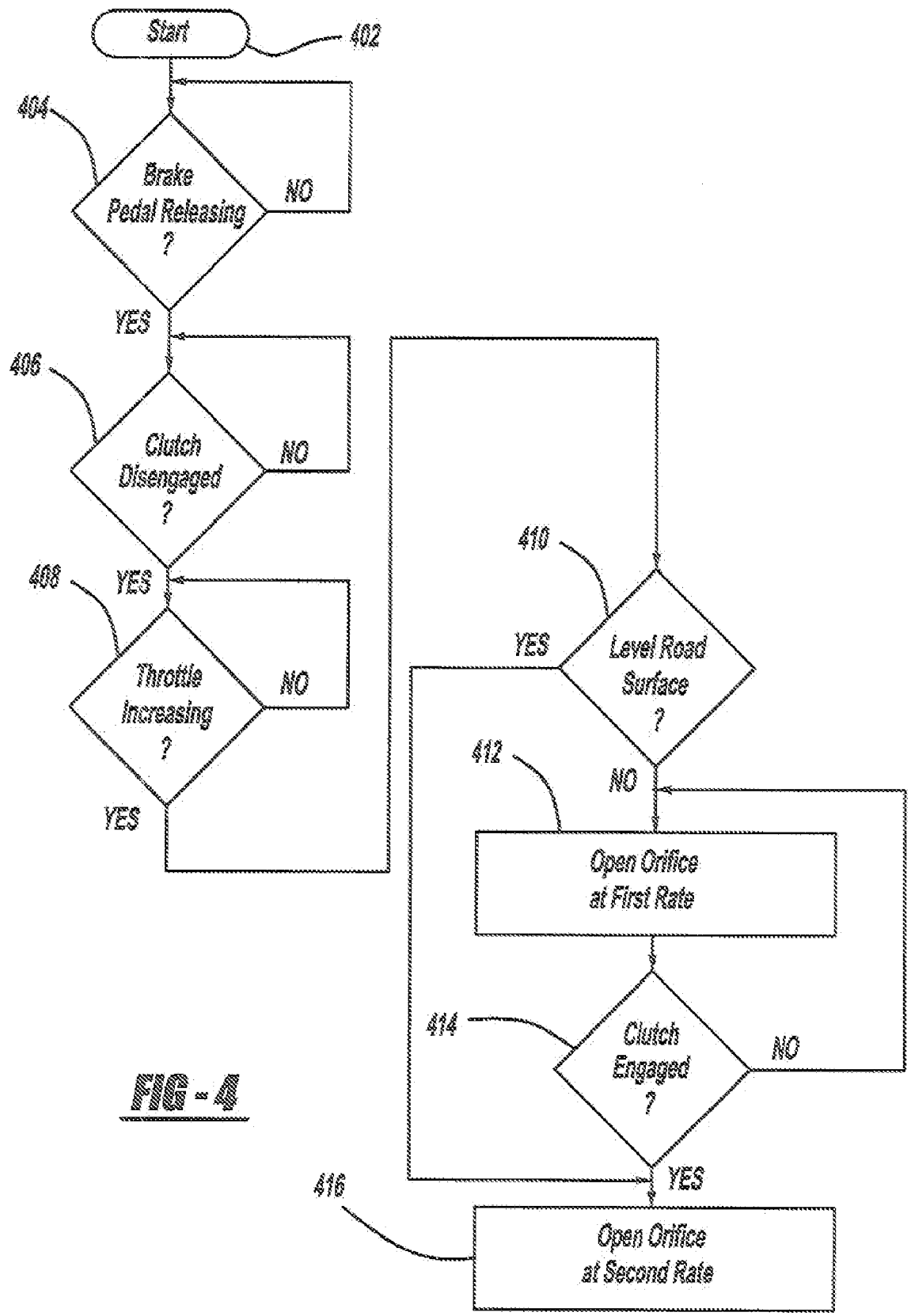
FIG. 4 is a flow chart of a hill-hold method implemented by the system of FIG. 2.

Power train control module 208 of system 200 of FIG. 2 implements a hill-hold function in accordance with the method set forth in the flow chart of FIG. 4. The routine is entered at 402 and controller 208 monitors for initiation of brake pedal release at step 404. For as long as the answer is no, the test continues. Upon detection of brake pedal release, the routine proceeds to step 406 where a test is made for clutch disengagement by monitoring clutch pedal sensor 210 of FIG. 2. This test is likewise continued until the answer is yes, whereupon at step 408 controller 208 monitors throttle sensor 212 to determine if the throttle is beginning to increase. Upon a positive result of the test at 408, the routine proceeds to step 410 where the grade or wheel sensor 206 is monitored by a control unit 208 to determine if the vehicle is presently on a level road surface. This test may be implemented using either a grade sensor or a wheel sensor for detecting reverse motion of the vehicle's wheels. For example, existing ABS wheel speed sensors could be utilized thus avoiding the necessity for inclusion of an additional grade sensor into the system. Using the reverse wheel motion detection approach would allow a slight amount of rollback which could be a driver irritant. On the other hand, such slight rollback could be justified by arguing that drivers are used to manual transmission cars rolling backwards on a hill, and that they could get used to the feature and even appreciate the fact that the hill-hold function is being implemented by the small amount of rollback which would then cease.

In any event, whichever approach is used, if a level road surface is detected then the routine skips to the last step 416 where the variable orifice 218 would be opened at the second higher rate immediately. If a level road surface is not present as detected by test 410, then at step 412 orifice 218 is opened at the first slow rate in effect activating the hill-hold function. This first rate is maintained during test 414 for so long as the clutch has not reengaged. If the clutch has engaged, then the routine proceed to step 416 for opening the orifice 218 at the faster rate.

Under either the economical or the more complicated approaches set forth above, when the brake pedal is released and the clutch pedal is still depressed the hill-hold algorithms would maintain caliper pressure by tuning the first and second orifice release rates to the engine speed acceleration rate from idle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of providing a hill-hold function for a vehicle equipped with a manual transmission and clutch, the method comprising:
    providing a selectively variable orifice in a brake hydraulic line of the vehicle, operative to fully close at zero vehicle speed and actuation of a brake pedal of the vehicle;
    opening the variable orifice at a first rate upon detection of release of the brake pedal while the clutch is disengaged and the throttle is starting to increase; and
    opening the variable orifice at a second rate higher than the first rate upon detection of clutch activation.

2. The method of claim 1 further comprising:
    skipping the opening of the variable orifice at the first rate and upon release of the brake immediately opening the variable orifice at the second rate whenever a substantially level roadway is detected.

3. The method of claim 2 wherein the substantially level roadway is detected using a grade sensor.

4. The method of claim 2 wherein the substantially level roadway is detected by absence of reverse rotation of wheels of the vehicle upon brake release.

5. An arrangement for providing a hill-hold function in a vehicle equipped with a manual transmission and clutch, the arrangement comprising:
    a selectively variable orifice positioned in a hydraulic brake fluid line of the vehicle;
    an auxiliary brake controller coupled to a control input of the selectively variable orifice operative to open and close the selectively variable orifice at a rate determined by a signal presented to the control input;
    an electronic vehicle control module coupled to the auxiliary brake controller; and
    a clutch pedal position sensor, a throttle sensor, a vehicle speed sensor and a brake pedal sensor, each coupled to a respective input of the electronic vehicle control module;
    the electronic vehicle control module operative to signal the auxiliary brake controller to fully close the selectively variable orifice whenever the vehicle speed sensor detects zero vehicle speed and the brake pedal sensor detects actuation of a brake pedal of the vehicle;
    the electronic vehicle control module further operative to signal the auxiliary brake controller to open the selectively variable orifice at a first rate whenever the brake pedal sensor detects release of the brake pedal, the clutch pedal position sensor detects disengagement of a clutch of the vehicle, and the throttle sensor detects initiation of increase of a throttle of the vehicle; and
    the electronic vehicle controller further operative to signal the auxiliary brake controller to open the selectively variable orifice at a second rate higher than the first rate when the clutch pedal position sensor detects clutch activation.

6. The arrangement of claim 5 further comprising a non-level roadway sensor coupled to the electronic vehicle control module, and wherein the vehicle control module activates and deactivates the auxiliary brake controller as a function of a signal from the non-level roadway sensor in addition to signals from one or more of the clutch pedal position sensor, the throttle sensor, the vehicle speed sensor and the brake pedal sensor.

7. The arrangement of claim 6 wherein the non-level roadway sensor comprises a non-zero grade sensor.

8. The arrangement of claim 6 wherein the non-level roadway sensor comprises a wheel direction of rotation sensor.

* * * * *